(12) United States Patent
Hagiwara et al.

(10) Patent No.: US 9,914,166 B2
(45) Date of Patent: Mar. 13, 2018

(54) RACK, METHOD FOR MANUFACTURING RACK, AND DEVICE FOR MANUFACTURING RACK

(71) Applicant: NSK Ltd., Shinagawa-ku, Tokyo (JP)

(72) Inventors: Nobuyuki Hagiwara, Fujisawa (JP); Yuuki Mizushima, Fujisawa (JP); Kazuto Kobayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 184 days.

(21) Appl. No.: 14/770,795

(22) PCT Filed: Feb. 6, 2014

(86) PCT No.: PCT/JP2014/052794
§ 371 (c)(1),
(2) Date: Aug. 26, 2015

(87) PCT Pub. No.: WO2014/132770
PCT Pub. Date: Sep. 4, 2014

(65) Prior Publication Data
US 2016/0001352 A1    Jan. 7, 2016

(30) Foreign Application Priority Data
Feb. 26, 2013 (JP) .................. 2013-035309

(51) Int. Cl.
*F16H 55/26* (2006.01)
*B21K 1/76* (2006.01)
(Continued)

(52) U.S. Cl.
CPC ............. *B21K 1/767* (2013.01); *B21J 13/025* (2013.01); *B62D 3/12* (2013.01); *B62D 3/126* (2013.01); *F16H 55/26* (2013.01)

(58) Field of Classification Search
CPC .. B21K 1/767; B21K 1/768; B21J 5/02; B21J 5/025; B21J 5/08; B21J 9/02; B21J 13/025; F16H 55/26
See application file for complete search history.

(56) References Cited

U.S. PATENT DOCUMENTS

| | | | |
|---|---|---|---|
| 6,601,428 B1 * | 8/2003 | Brenner ................ | B21K 1/767 29/893.34 |
| 2005/0115298 A1 * | 6/2005 | Brenner ................ | B21K 1/767 72/370.21 |

(Continued)

FOREIGN PATENT DOCUMENTS

| | | | | |
|---|---|---|---|---|
| GB | 2056894 A | * | 3/1981 | ............. B21K 1/767 |
| GB | 2 108 026 A | | 5/1983 | |

(Continued)

OTHER PUBLICATIONS

Extended European Search Report dated Sep. 9, 2016, in European Patent Application No. EP14756580.8.

(Continued)

*Primary Examiner* — Edward Tolan
(74) *Attorney, Agent, or Firm* — Shapiro, Gabor and Rosenberger, PLLC

(57) ABSTRACT

Provided are a manufacturing method and manufacturing device that allow the depth of rack teeth to be adequately maintained across the axial direction. A stepped surface (47) is provided on one surface in the axial direction of a pressure punch (46) that moves together with a teeth-forming punch (32). The teeth-forming punch (32) is displaced downward and rack teeth are formed on the upper surface of an intermediate material (23). At the same time, the surface on the end in the axial direction of the intermediate material (23) is pressed in the axial direction by a movable die (41*a*) due to the engagement between the stepped surface (47) and (Continued)

the surface on the other side in the axial direction of the movable die (41*a*).

7 Claims, 16 Drawing Sheets

(51) Int. Cl.
*B62D 3/12* (2006.01)
*B21J 13/02* (2006.01)

(56) References Cited

U.S. PATENT DOCUMENTS

| 2007/0079643 | A1* | 4/2007 | Dohmann | B21J 5/12 |
| | | | | 72/353.2 |
| 2010/0162843 | A1 | 7/2010 | Kobayashi et al. | |
| 2012/0137747 | A1 | 6/2012 | Cornish et al. | |
| 2013/0042662 | A1* | 2/2013 | Cornish | B21J 5/12 |
| | | | | 72/342.1 |
| 2013/0192330 | A1* | 8/2013 | Dohmann | B21J 13/02 |
| | | | | 72/352 |

FOREIGN PATENT DOCUMENTS

| JP | 5-237584 A | * | 9/1993 | ................ B21J 5/08 |
| JP | 10-058081 A | | 3/1998 | |
| JP | 2001-079639 A | | 3/2001 | |
| JP | 3442298 B | | 6/2003 | |
| JP | 2006-103644 A | | 4/2006 | |
| JP | 2008-138864 A | | 6/2008 | |
| JP | 2009-262694 A | | 11/2009 | |
| WO | WO 2011/017736 A1 | | 2/2011 | |

OTHER PUBLICATIONS

International Search Report from International Patent Application No. PCT/JP2014/052794, dated Apr. 22, 2014.
Written Opinion of International Searching Authority for International Patent Application No. PCT/JP2014/052794, dated Apr. 22, 2014.

\* cited by examiner

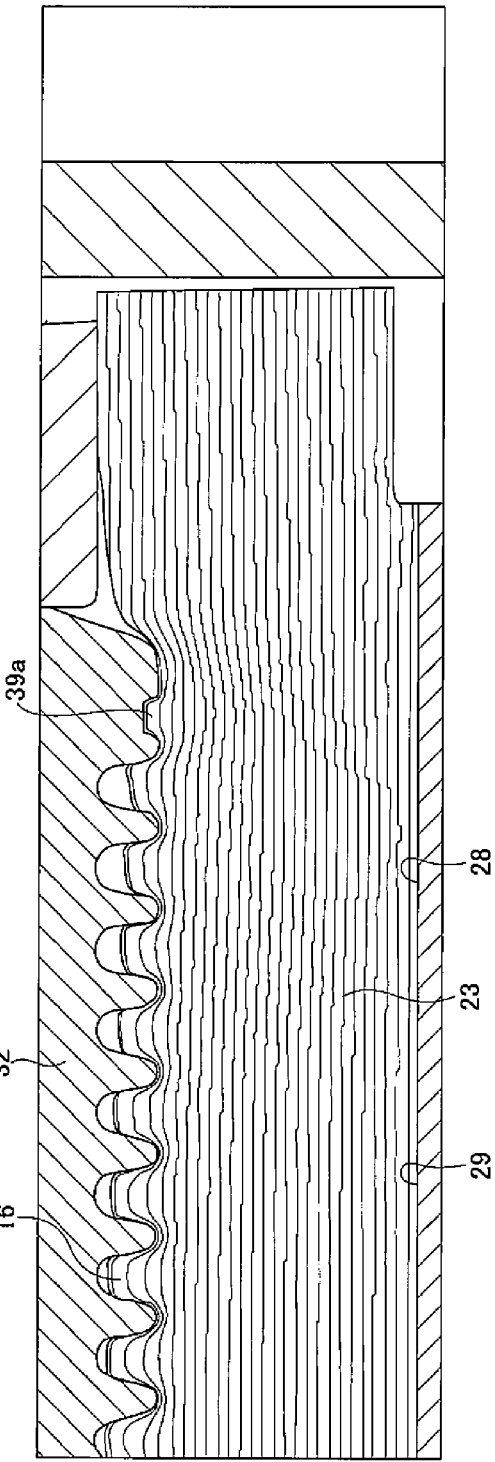
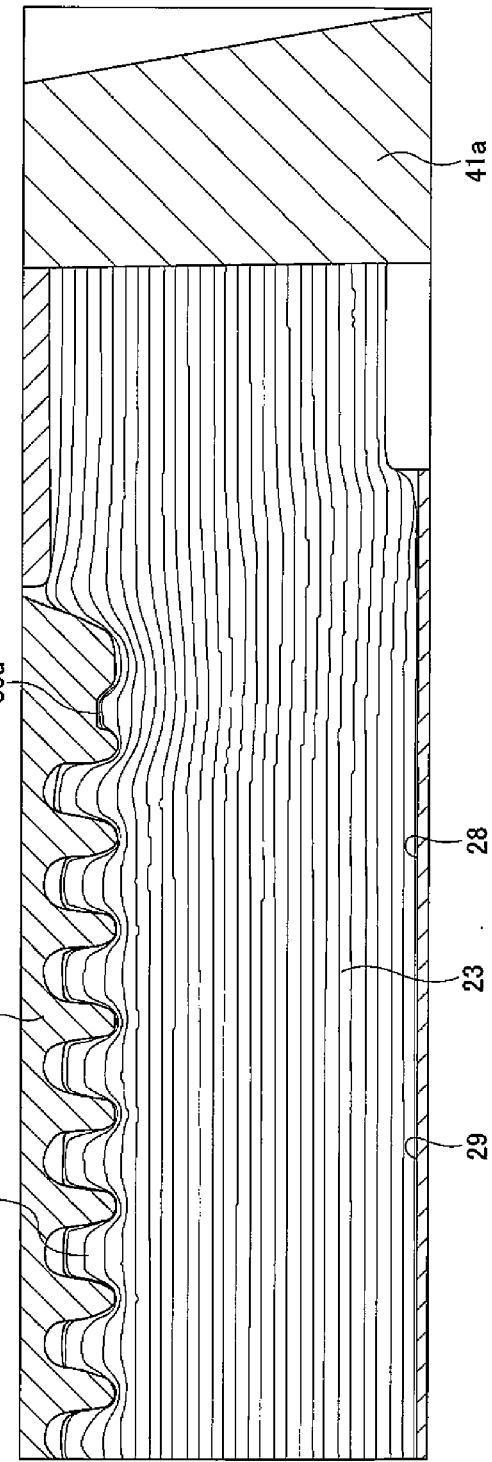
Fig.11 (A)
Fig.11 (B)

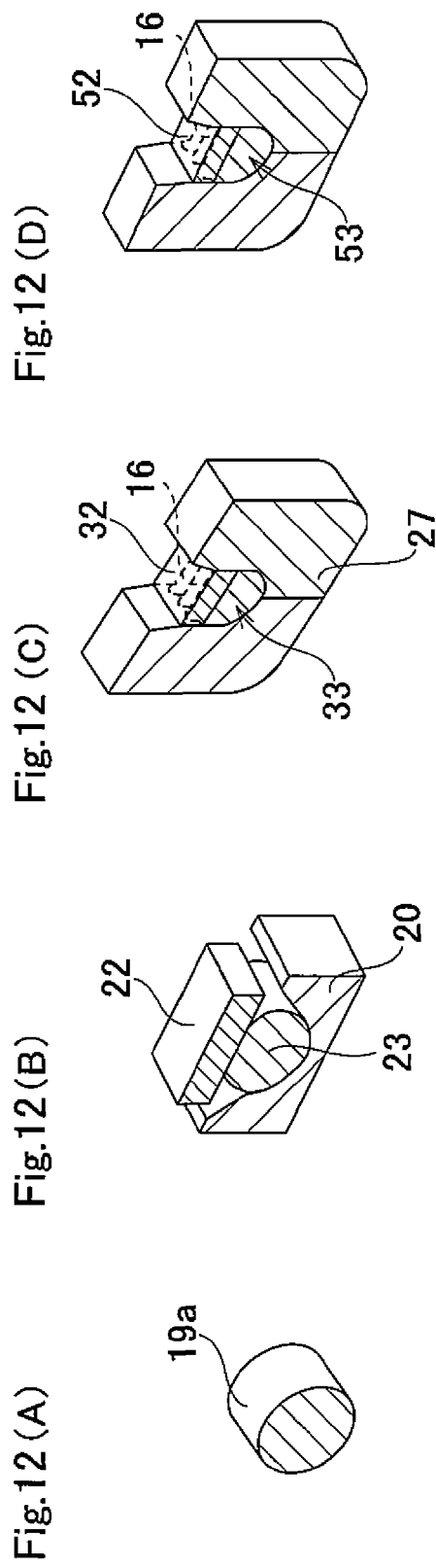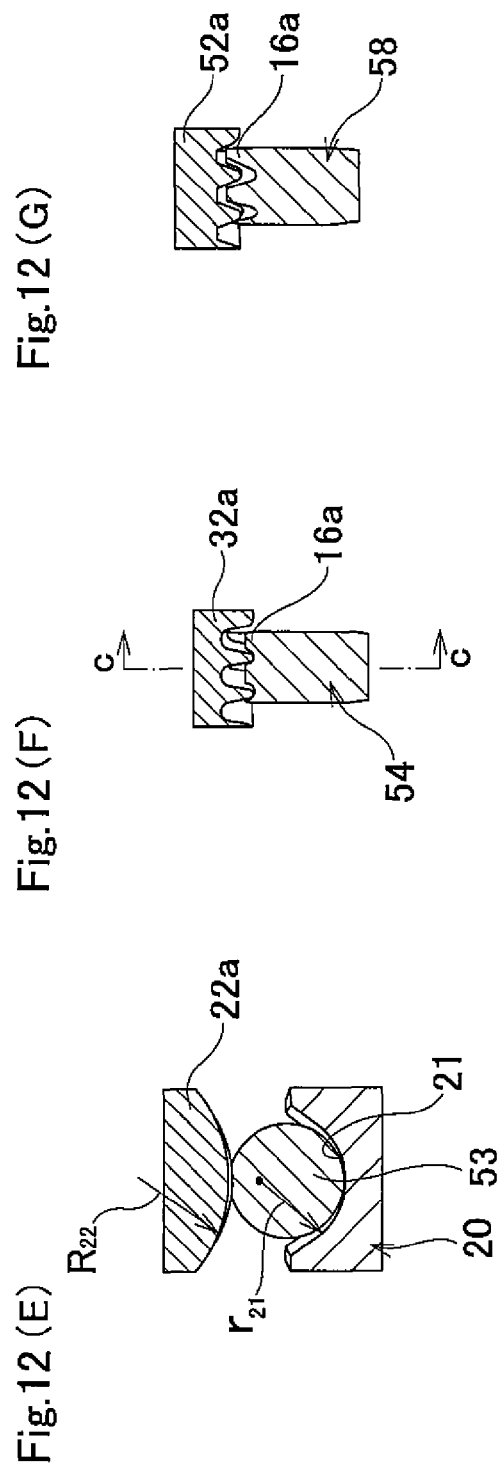

RACK, METHOD FOR MANUFACTURING RACK, AND DEVICE FOR MANUFACTURING RACK

TECHNICAL FIELD

The present invention relates to a rack that is assembled in the steering gear of an automobile steering apparatus, and that pushes and pulls tie-rods according to displacement in the axial direction, and relates to the manufacturing method and manufacturing device thereof.

BACKGROUND ART

In a steering apparatus such as illustrated in FIG. 14 for applying a steering angle to the steered wheels of an automobile, the motion of a steering shaft 2 that rotates as a steering wheel 1 is operated is transmitted to an input shaft 6 of a steering gear 5 by way of a pair of universal joints 3 and an intermediate shaft 4. The steering gear 5 has a pinion that is rotated and driven by the input shaft 6, and a rack that engages with the pinion. As the pinion rotates together with the input shaft 6, the rack moves in the axial direction, which pushes and pulls a pair of tie rods 7 that are linked to both ends of the rack, and applies a desired steering angle to the steered wheels.

A gear housing 9 is connected to the bottom end of a steering column 8 inside which the steering shaft 2 is inserted, and this gear housing 9 supports an electric motor 10. The electric motor 10 applies an auxiliary force in the direction of rotation to the steering shaft 2.

On the other hand, in addition to the column-assist type of electric-powered power-steering apparatus illustrated in FIG. 14, there are also electric-powered power-steering apparatuses called pinion-assist type, dual-pinion type, and rack-assist type that are being used. FIG. 15 illustrates a steering apparatus in which a dual-pinion type electric-powered power-steering apparatus is assembled. In this dual-pinion type steering apparatus, a second input shaft 12 is located in a portion of part in the axial direction of a rack 11 that is separated from a pinion (first pinion) that is provided around the outer-circumferential surface of an input shaft (first input shaft) 6. The second pinion that is provided around the outer-circumferential surface of one end of the second input shaft 12 engages with the rack 11. An electric motor 10a is supported on the side of a housing 13 inside which the second input shaft 12 is housed. The electric motor 10a applies a force in the direction of rotation of the second input shaft 12 by way of a reduction gear 14. Therefore, the rack 11 moves in the axial direction according to the sum of a force that is based on an auxiliary force from the electric motor 10a, and a force by way of the input shaft 6 that is applied to a steering wheel 1 by an operator.

Rack teeth are provided in the axial direction along one side surface in the radial direction of this kind of steering gear rack except on both ends where the tie rods are connected. When constructing this rack, the rack teeth are formed by a cutting process, which together with increasing the manufacturing cost, makes it difficult to maintain the strength and rigidity of the rack teeth. On the other hand, by forming the rack teeth by plastic deformation, it is possible to reduce the manufacturing cost by shortening the time required for processing the teeth, and, the metal structure of the rack teeth becomes dense, so it becomes easy to maintain the strength and rigidity of the rack teeth. Methods for manufacturing a rack having teeth that are formed by plastic deformation are known, such as disclosed in JP H10-58081 (A), JP 2001-79639 (A), Japanese Patent No. 3,442,298, JP 2006-103644 (A) and JP 2008-138864 (A).

FIG. 16 to FIG. 21 illustrate an example of a conventional rack and manufacturing method thereof as disclosed in JP 2006-103644 (A). A rack 11a has a rod section 15 having a circular cross-sectional shape and that is made using a metal material such as carbon steel, stainless steel and the like, and rack teeth 16 that are formed by plastic working on one side surface in the radial direction of part in the axial direction of the rod section 15. In the example in the figures, the rod section 15 is integrally formed over the entire length using a metal material. Moreover, the radius of curvature $R_{17}$ of the cross-sectional shape of the rear surface portion 17 on part in the axial direction of the rod section 15 that is separated in the circumferential direction from the portion where the rack teeth 16 are formed is greater than the radius of curvature $r_{18}$ of the outer-circumferential surface of a circular rod section 18, which is the remaining part in the axial direction of the rod section 15 ($R_{17} > r_{18}$) (see FIG. 19). With this kind of construction, it is possible to make the rack 11a more lightweight by keeping the outer diameter of the portion other than where the rack teeth 16 are formed from becoming larger than necessary, while sufficiently maintaining the width dimension, strength, and rigidity of the rack teeth 16. The tooth depth of the rack teeth 16 (half the difference between the diameter of the tooth tip circle and the diameter of tooth base circle) is normally about 10% to 20% the diameter of the rod section 15.

In order to manufacture the rack 11a, first, as illustrated in FIG. 20A, a circular rod shaped raw material 19 is mounted into a concave groove section 21 having an arc-shaped cross section that is provided on the top surface of a receiving mold 20. Next, as illustrated in FIG. 20B, an upsetting process is performed by strongly pressing the raw material 19 toward the concave groove section 21 by the tip-end surface (bottom-end surface) of a pressure punch 22 that extends along the concave groove section 21. In this upsetting process, the portion of the raw material 19 where the rack teeth 16 are to be formed is squashed in the up-down direction, and the width dimension in the horizontal direction is widened to obtain and intermediate material 23. The intermediate material 23 has: a partial cylindrical-surface section 24 that will become the rear-surface portion 17, a flat-surface section 25 that is on the opposite side in the radial direction of the cross section from the partial cylindrical-surface section 24, and a pair of curved-surface sections 26 having a comparatively small radius of curvature that continuously connects the partial cylindrical-surface section 24 and flat-surface section 25.

Next, the intermediate material 23 is removed from the concave groove section 21, and as illustrated in FIG. 20C, is inserted into and placed at the bottom of a bottom section 29 of a support hole 28 that is provided in a die 27. The support hole 28 has a U-shaped cross section, and the radius of curvature of the bottom section 29 is nearly the same as the radius of curvature of the inner surface of the concave groove section 21 of the receiving mold 16. A pair of inside surfaces 30 is located on both sides in the width direction of the support hole 28, and these surfaces are flat surfaces that are parallel to each other. Furthermore, a pair of inclined guide surfaces 31 inclined in a direction so that the space between them increases going upward is provided at the opening on the top end of the support hole 28.

As illustrated in FIG. 20C and FIG. 20D, a teeth-forming punch 32 is inserted into the support hole 28 and this teeth-forming punch 32 strongly presses the intermediate member 23 inside the support hole 28. The processing surface (bottom surface) of the teeth-forming punch 32 has a shape that corresponds to the rack teeth 16 to be formed. Moreover, the outer-circumferential surface of the intermediate material 23, except for the flat surface section 25 where the rack teeth 16 are to be formed, is constrained by the inner surface of the support hole 28. Therefore, by the teeth-forming punch 32 strongly pressing the intermediate material inside the support hole 28, the flat surface section 25 of the intermediate material 23 is plastically deformed following the wave-shaped uneven surface on the lowered surface of the teeth-forming punch 32, and a raw rack 33 such as illustrated in FIG. 20D and FIG. 21A is obtained. However, the precision of the shape and dimensions of the raw rack 33, when compared with a completed rack 11a (see FIG. 16 to FIG. 19), is not sufficient, and the edge of the end with the rack teeth 16 remains sharp. Moreover, when processing the rack teeth 16, the excess material that is pushed out from the portion that will become the base of the teeth is strongly pressed against the inside surfaces 30 of the support hole 28, so a pair of flat flank surface sections 34 that are parallel to each other are formed on the left and right side surface of the raw rack 33.

After the teeth-forming punch 32 has been raised, the raw rack 33 is removed from the support hole 28, and as illustrated in FIG. 20E, is then placed on an uneven sizing surface 36 that is formed on the top surface of a sizing die 35. When doing this, the raw rack 33 is turned up side down. The uneven sizing surface 36 has a shape that corresponds to the rack teeth 16 to be obtained, including the shape of the chamfer sections on the end edges of the teeth. A stamp 37, as illustrated in FIG. 20E and FIG. 20F, strongly presses the portion of the raw rack 33 where the rack teeth 16 are formed toward the uneven sizing surface 36.

A concave pressing groove 38 having a radius of curvature that matches the radius of curvature $R_{17}$ of the rear surface portion 17 of the completed rack 11a is formed on the bottom surface of the stamp 37, and with the portion that will become the rear surface portion 17 fitted inside the concave pressing groove 38, the raw rack 33 is strongly pressed toward the uneven sizing surface 36. With the sizing die 35 and stamp 37 sufficiently close together as illustrated in FIG. 20F, the rack teeth 16 are formed into the completed state illustrated in FIG. 21B, or in other words, the shape and dimensions thereof become proper, while a chamfer is provided on the end edges of each of the teeth, and the shape and dimensions of the rear surface portion 17 become proper at the same time. The excess material that was pressed out by this sizing process is collected in the pair of flat surface sections 34. Therefore, the pair of flat flank surface sections 34 hardly remains in the completed rack 11a. When doing this, the extra material does not apply extremely strong pressure against the uneven sizing surface 36 or concave pressing groove 38, so the processing load during sizing is kept low, and it is easy to maintain the durability of the sizing die 35 and stamp 37.

However, in the case of the conventional manufacturing method for a rack, there is a possibility that problems such as the following could occur. In other words, as illustrated in FIG. 20C and FIG. 20D, when the teeth-forming punch 32 strongly presses the intermediate material 23 inside the support hole 28, part of the metal material of the intermediate material 23 moves toward the outside in the axial direction from the end section in the axial direction of the portion where the rack teeth 16 are to be formed (portion separated in the axial direction from the power pressed by the teeth-forming punch 32) as the teeth-forming punch 32 presses the material. As a result, as illustrated in FIG. 22, the depth of the rack teeth 16 becomes smaller on the end section in the axial direction of the rack teeth 16 going toward the outside in the axial direction, and when the completed rack is assembled in the steering gear 5, there is a possibility that on the end in the axial direction of the rack teeth, the engaged state between the rack teeth 16 and the pinion that is formed around the outer-circumferential surface of the input shaft 6 will not be able to be maintained.

On the other hand, as illustrated in FIG. 23, it is possible to provide dummy teeth (excess section) 39, 39a in the portion of part in the axial direction of the rod section 15a that is adjacent to the portion where the rack teeth 16 are to be formed and having a tooth depth that is less than that of the rack teeth 16 so that there is no engagement with the pinion that is formed around the outer-circumferential surface of the input shaft 6 even when the steering gear 5 is in use. As a result, the tooth depth is prevented from becoming insufficient on the end section in the axial direction of the rack teeth 16, and it is possible properly maintain an engaged state between the rack teeth 16 and the pinion on the input shaft 6. However, with this construction, by providing dummy teeth 39, 39a, there are problems in that the length in the axial direction of the portion where plastic deformation is performed increases, and it is necessary to also increase the length in the axial direction of the processing tools (punch and die). Moreover, there is also a problem in that it becomes impossible to sufficiently maintain the thickness between a screw hole 57 for screwing in a male screw section of a ball joint for connecting to the tie rod and the dummy teeth 39a that are provided on the screw hole 57 side.

RELATED LITERATURE

Patent Literature

[Patent Literature 1] JP H10-58081 (A)
[Patent Literature 2] JP 2001-79639 (A)
[Patent Literature 3] Japanese Patent No. 3,442,298
[Patent Literature 4] JP 2006-103644 (A)
[Patent Literature 5] JP 2008-138864 (A)

SUMMARY OF INVENTION

Problem to be Solved by Invention

Taking the situation above into consideration, the object of the present invention is to provide a rack for which the tooth depth of the rack teeth can be sufficiently maintained over the length in the axial direction.

Means for Solving Problems

The manufacturing method for a rack of the present invention comprises a process of forming rack teeth on a surface on one side in the radial direction by pressing a teeth-forming punch that is provided with rack-shaped uneven processing teeth against a surface on one side in the radial direction of part in the axial direction of a raw material made of metal, and causing the surface of the one side in the radial direction to plastically deform.

Particularly, in the case of the manufacturing method for a rack of the present invention, when pressing the teeth-forming punch against the surface on one side in the radial direction, the surface on the one side in the radial direction is plastically deformed while the raw material is pressed in the axial direction.

Preferably, the raw material is pressed in the axial direction by a constant force while the surface on the one side in the radial direction is being plastically deformed.

In this embodiment, more specifically, a pressure punch that raises and lowers together with the teeth-forming punch, and comprises a surface on one side in the axial direction that is a stepped surface; and a movable die that comprises a surface on one side in the axial direction that faces the surface on the end in the axial direction of the raw material, and a surface on the other side in the axial direction that faces the stepped surface of the pressure punch when the teeth-forming punch is displaced toward the raw material, and to which an elastic force is applied toward the pressure punch are provided; and as the teeth-forming punch is displaced toward the raw material, the stepped surface of the pressure punch engages with the surface on the other side in the axial direction of the movable die, causing the movable die to be displaced in the axial direction, and the movable die presses the surface on the end in the axial direction of the raw material in the axial direction.

In this embodiment, preferably the rack teeth are formed so that when the length in the axial direction of the portion of the raw material where the rack teeth are formed is taken to be $L_R$, and the length in the axial direction of the remaining portion of the raw material that is separated in the axial direction from the portion where the rack teeth are formed is taken to be L, the relationship $L \leq L_R/4$ is satisfied.

In the manufacturing method for a rack of the present invention, it is also possible to increase the force of pressing the raw material in the axial direction as the surface on one side in the radial direction is plastically deformed.

In this embodiment, more specifically, a pressure punch that raises and lowers together with the teeth-forming punch, and comprises a surface on one side in the axial direction that is an inclined surface; and a movable die that comprises a surface on one side in the axial direction that faces the surface on the end in the axial direction of the raw material, and a surface on the other side in the axial direction that faces the inclined surface of the pressure punch when the teeth-forming punch is displaced toward the raw material, and to which an elastic force is applied toward the pressure punch are provided; and as the teeth-forming punch is displaced toward the raw material, the inclined surface of the pressure punch engages with the surface on the other side in the axial direction of the movable die, causing the movable die to be displaced in the axial direction, and the movable die presses the surface on the end in the axial direction of the raw material in the axial direction.

In this embodiment, preferably, the rack teeth are formed so that when the length in the axial direction of the portion of the raw material where the rack teeth are formed is taken to be $L_R$, and the length in the axial direction of the portion of the raw material that is separated in the axial direction from the portion where the rack teeth are formed is taken to be L, the relationship $L \geq L_R$ is satisfied.

The manufacturing device for a rack of the present invention comprises: a teeth-forming punch that is provided with rack-shaped uneven processing teeth; a pressure punch that raises and lowers together with the teeth-forming punch and that comprises a surface on one side in the axial direction having a stepped surface or inclined surface; and a movable die that comprises a surface on one side in the axial direction that faces the surface on the end in the axial direction of a raw material made of metal, and a surface on the other side in the axial direction that faces the stepped surface or inclined surface of the pressure punch when the teeth-forming punch moves toward the raw material, and to which an elastic force is applied toward the pressure punch. The manufacturing device for a rack of the present invention is constructed so that when forming rack teeth on the surface of the one side in the radial direction of part in the axial direction of the raw material made of metal by pressing the teeth-forming punch against the surface on the one side in the radial direction, as the teeth-forming punch moves toward the raw material, the surface on the other side in the axial direction of the movable die engages with the stepped surface or inclined surface of the pressure punch, the movable die moves in the axial direction, and the movable die presses the surface on the end in the axial direction of the raw material.

The rack of the present invention is obtained by the manufacturing method and manufacturing device for a rack of the present invention, and comprises a metal rod section, and rack teeth that are formed on part in the axial direction of the surface on one side in the radial direction of the rod section.

Effect of Invention

With the manufacturing method and manufacturing device for a rack of the present invention, when forming rack teeth by pressing a teeth-forming punch against the surface on one side in the radial direction of a rod section of a metal raw material, the rod section is pressed in the axial direction, so the metal material of the raw material can be kept from moving toward the outside in the axial direction on the end section in the axial direction of the portion where the rack teeth are to be formed, and it is possible to prevent the tooth depth of the rack teeth from becoming small on the end section in the axial direction. Therefore, in the case of the rack of the present invention, it is possible to sufficiently maintain the tooth depth of the rack teeth that are formed in part in the axial direction of the rod section over the axial direction, so when assembling the rack in a steering gear of an automobile steering apparatus, for example, it is possible to keep the engaged state between the rack teeth and the pinion on the input shaft proper. Moreover, in the case of the present invention, there is no need for dummy teeth that do not engage with the pinion during use in the portion adjacent in the axial direction to the portion where the rack teeth are to be formed, and even in the case that dummy teeth are provided, it is possible to suppress the number of dummy teeth.

BRIEF DESCRIPTION OF DRAWINGS

FIG. 11A illustrates the fiber flow of a rack that is obtained by a conventional manufacturing method for a rack, and FIG. 11B illustrates the fiber flow of a rack that is obtained by the manufacturing method for a rack of the present invention.

FIGS. 12A to 12G are cross-sectional views of the second example of an embodiment of the present invention, and illustrate the processing order of the manufacturing process for a rack.

MODES FOR CARRYING OUT INVENTION

[First Example]

Figure 20:
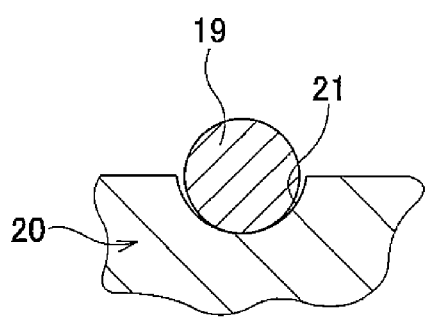
FIGS. 20A to 20F are cross-sectional views as seen from the same direction as in FIG. 19, and illustrates a first example of the processing order of a conventional manufacturing method for a rack.
Figure 20:
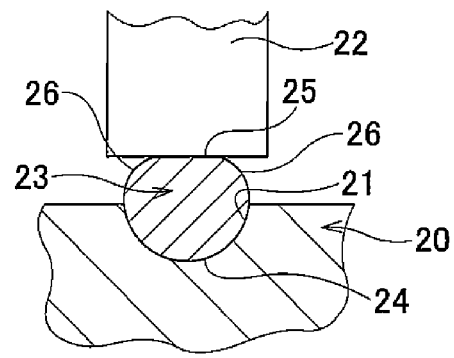
Figure 20:
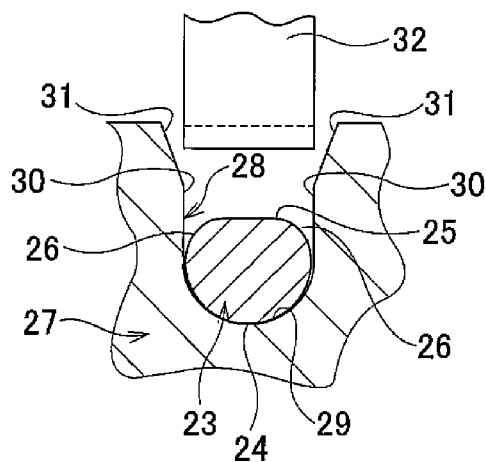
Figure 20:
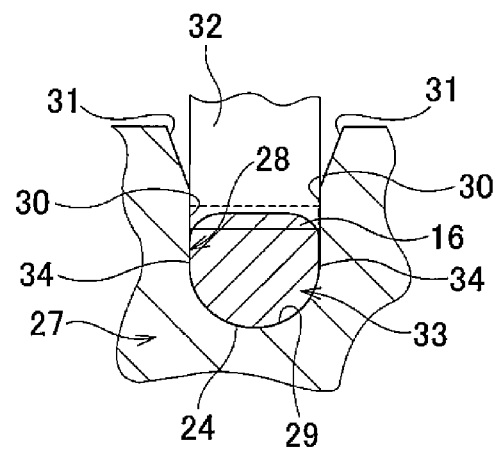
Figure 20:
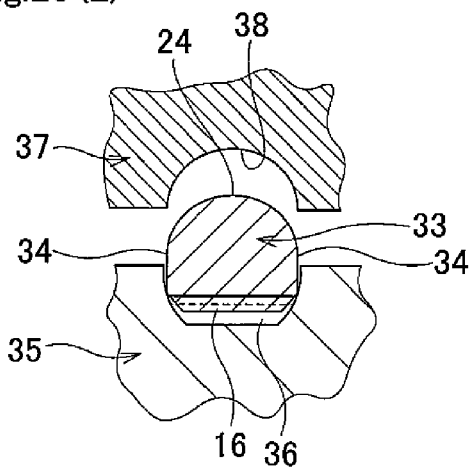
Figure 20:
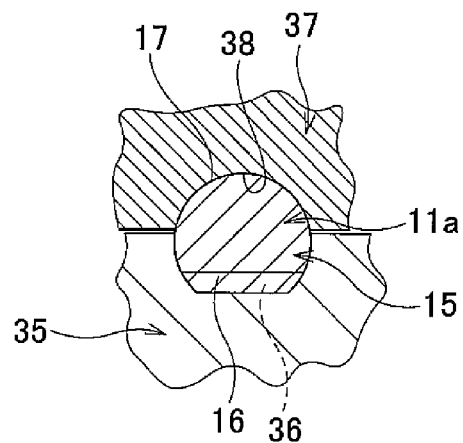
Figure 21:
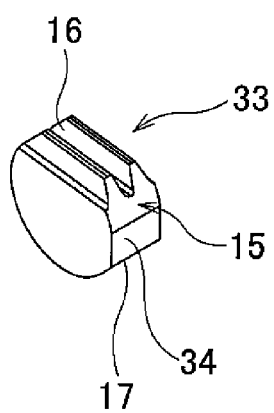
FIGS. 21A and 21B are partial perspective views illustrating the shape of rack teeth before and after sizing in the first example of a conventional manufacturing method for a rack.
Figure 21:
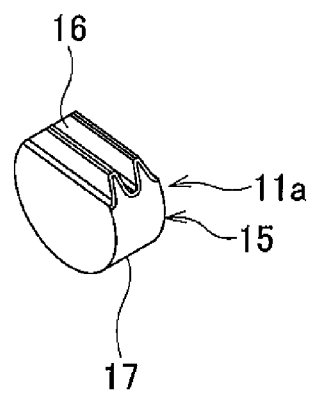
Figure 22:
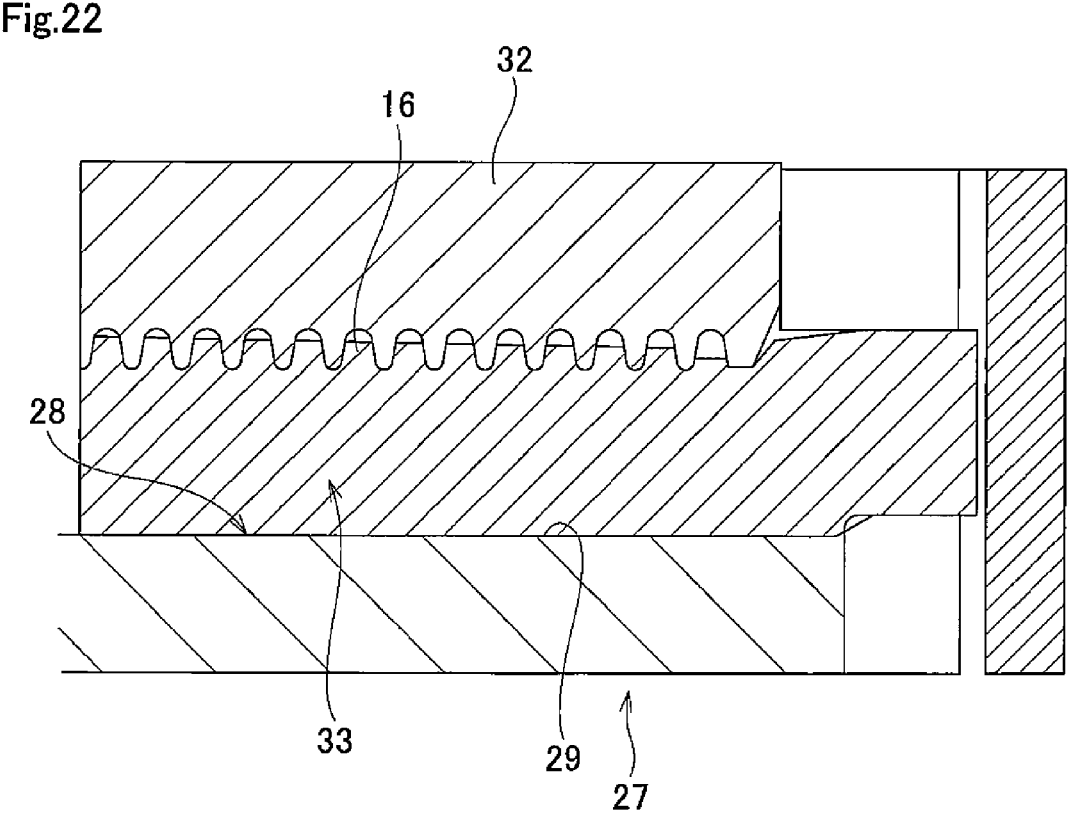
FIG. 22 is a cross-sectional view for explaining the problems of a conventional manufacturing method and manufacturing device for a rack.

FIG. 1 to FIG. 11 illustrate a first example of an embodiment of the present invention. In this example as well, similar to the conventional technology, this manufacturing method for a rack has steps of: (1) performing an upsetting process to squash the portion of a circular rod shaped raw material 19 where rack teeth are to be formed and expand the width dimension in the horizontal direction to obtain an intermediate material 23 (see FIG. 20A and FIG. 20B); (2) inserting and placing the intermediate material 23 into a support hole 28 that is provided in a die 27, then further inserting a teeth-forming punch 32 inside the support hole 28, and using the teeth-forming punch 32 to strongly press the intermediate material 23 inside the support hole 28 to obtain a raw rack 33 (see FIG. 20C and FIG. 20D); and (3) using a sizing die 35 to complete the rack teeth 16, or in other words to make the shape and dimensions of the rack teeth 16 proper, and to provide a chamfer on the edges of the ends of each of the teeth (see FIG. 20E and FIG. 20F). A feature of the manufacturing method and manufacturing device for a rack of this invention, including this example, is to suppress movement of the metal material of the rack 11c in the axial direction when forming rack teeth 16 on the surface of one side in the radial direction of part in the axial direction of the rod section 15 of the rack 11c (process corresponding to FIG. 20C and FIG. 20D), and prevent the tooth depth of the rack teeth 16 from becoming small on the end sections in the axial direction. The construction and functions of the other parts are the same as those of the conventional manufacturing method and manufacturing device for a rack. In FIG. 1 to FIG. 6, the rack teeth 16 and the unevenness of the processing surface of the teeth-forming punch 32 are omitted.

In this example, the manufacturing device for a rack has a die 27a, a teeth-forming punch 32, and a pressure punch 46. The die 27a is supported by a support base 43, and has a stationary die 40, and a pair of movable dies 41a, 41b. The stationary die 40 has a support hole 28. Moreover, an elastic force is applied in an upward direction (direction going away from the stationary die 40) to the pair of movable dies 41a, 41b by an elastic member 42 such as coil springs, air cylinders or the like. An elastic force outward in the axial direction (to the right in FIG. 1) is applied by an elastic member such as a spring not illustrated in the figure to one of the movable dies 41a (die on the right in FIG. 1) of the pair of movable dies 41a, 41b. On the other hand, the other movable die 41b (left side in FIG. 1) is able to move only in an up or down direction along the inside surface of a concave section 44 that is formed in the support base 43.

Moreover, the teeth-forming punch 32 and the pressure punch 46 are supported by a rack 45 that is able to move up or down. Rack-shaped uneven teeth are provided on the teeth-forming punch 32. The pressure punch 46 moves up or down together with the teeth-forming punch 32, and has a surface on one side in the axial direction (inside surface; surface on the left side in FIG. 7). The surface on one side in the axial direction of the pressure punch 46 is a stepped surface 47 such that upper half is closer to the center in the axial direction than the lower half.

Figure 1:
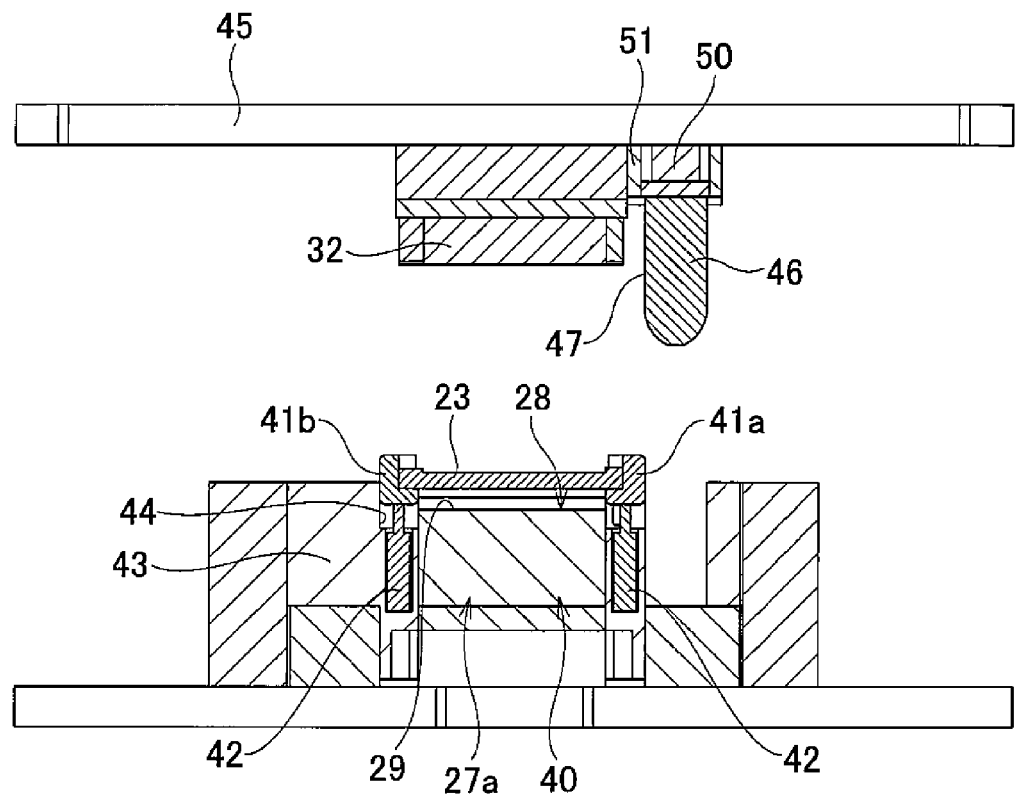
FIG. 1 is a cross-sectional view of a first example of an embodiment of the present invention, and illustrates a state in which a ram is positioned at the top dead center.

As illustrated in FIG. 1, the intermediate material 23 that is obtained by performing an upsetting process on the raw material 19 is set into the die 27a. In this state, the surface on one side in the axial direction of one movable die 41a faces the surface on one end in the axial direction of the intermediate material 23. In this state, there is a space between the surface on the other side in radial direction of the intermediate material 23, which will become the rear surface portion of the completed rack 11c, and the bottom section 29 of the support hole 28.

Figure 2:
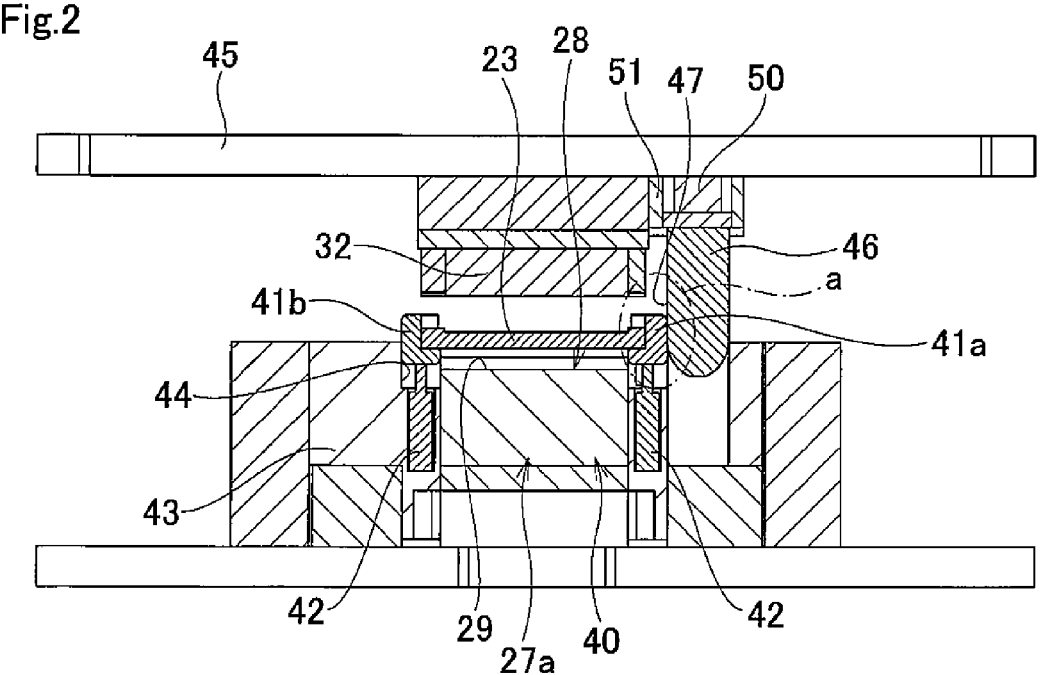
FIG. 2 is a cross-sectional view of the first example, and illustrates a state in which the ram has been displaced downward.
Figure 3:
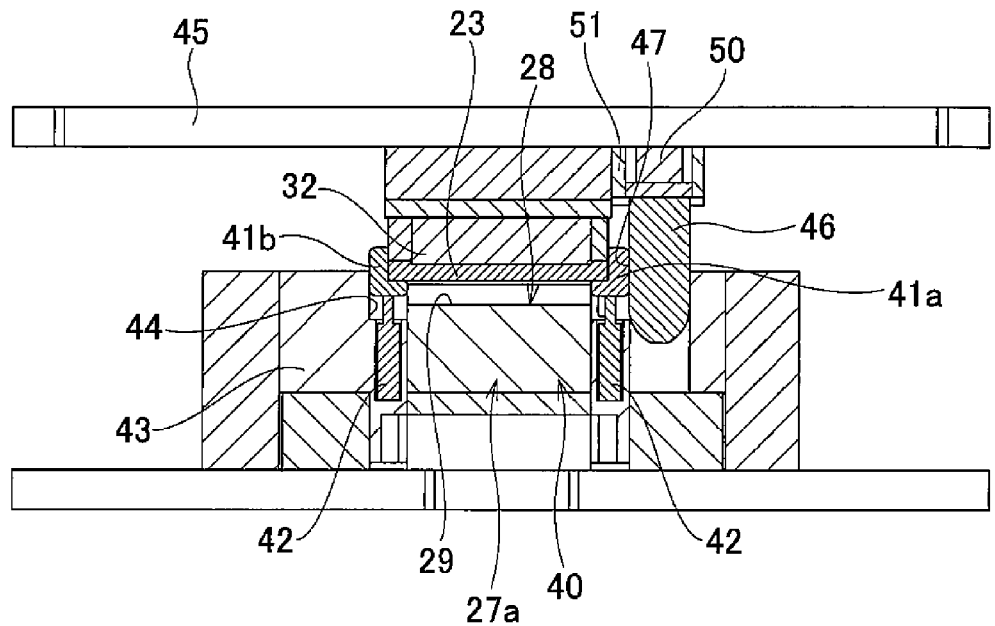
FIG. 3 is a cross-sectional view of the first example, and illustrates a state in which the ram has been displaced downward further than the state illustrated in FIG. 2.
Figure 4:
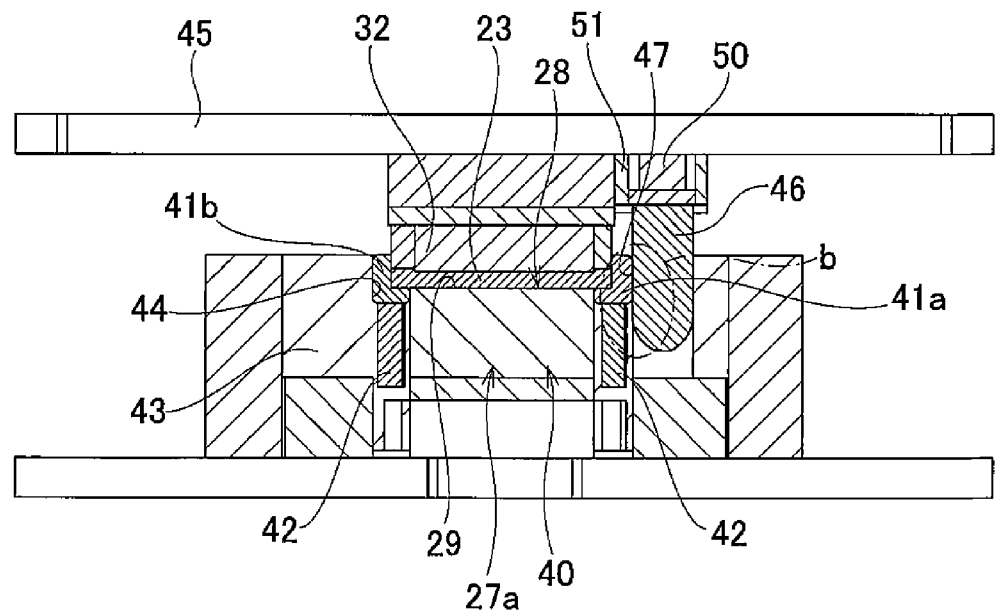
FIG. 4 is a cross-sectional view of the first example, and illustrates a state in which the ram has been lowered to the bottom dead center.
Figure 5:
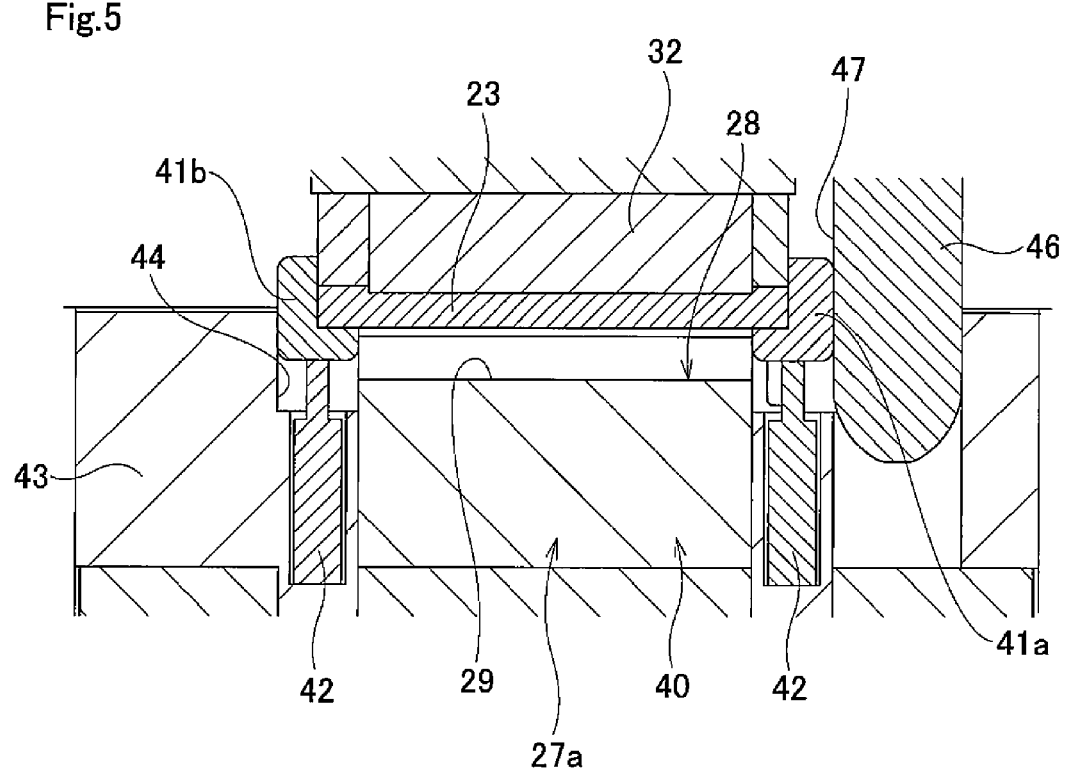
FIG. 5 is an enlarged view of the center section of FIG. 3.
Figure 6:
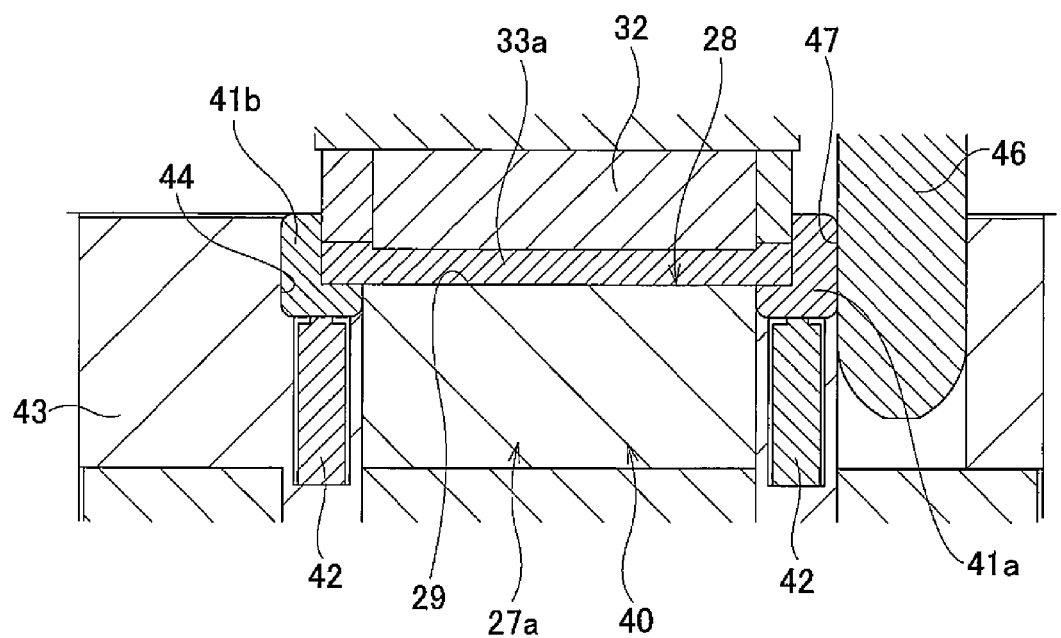
FIG. 6 is an enlarged view of the center section of FIG. 4.
Figure 7:
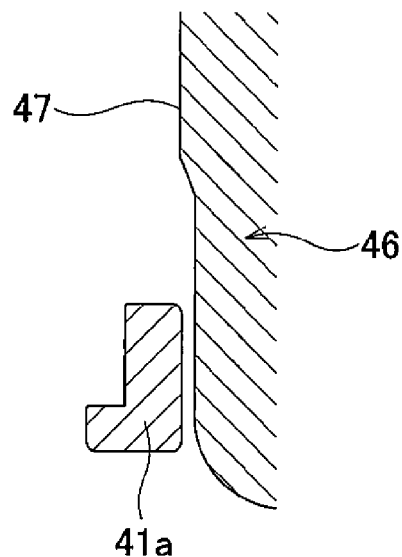
FIG. 7A is an enlarged view of section a in FIG. 2.
FIG. 7B is an enlarged view of section b in FIG. 4.
Figure 7:
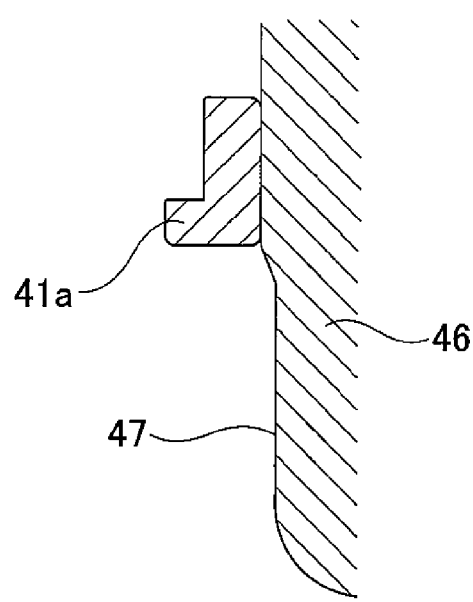
Figure 8:
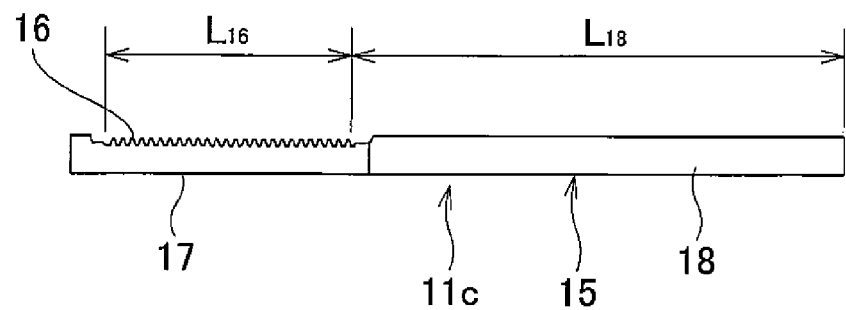
FIG. 8 is a side view for explaining the dimensions of each of the parts of a rack.
Figure 9:
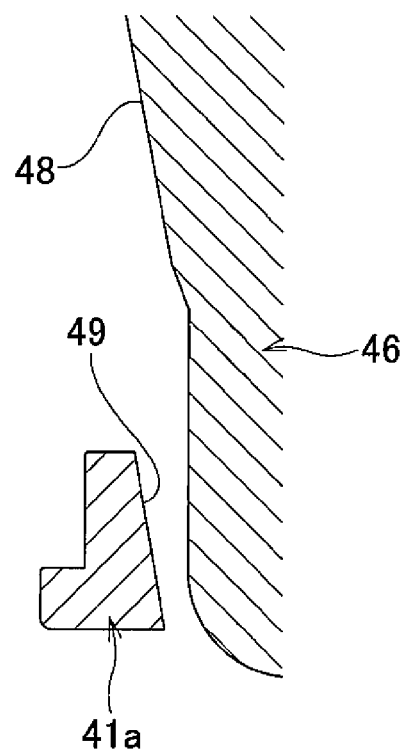
FIGS. 9A and 9B are views similar to FIGS. 7A and 7B, and illustrate an example of a different shape pressure punch and one moving die.
Figure 9:
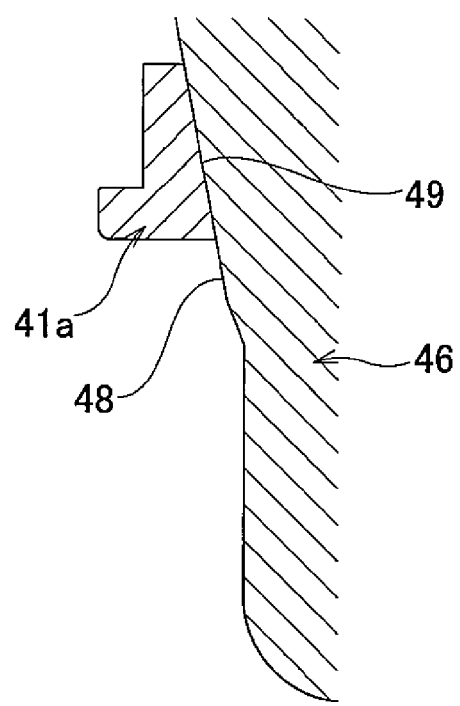

When the ram 45 is lowered, the stepped surface 47 of the surface on one side in the axial direction of the pressure punch 46 faces the surface on the other side (outside surface; surface on the right side in FIG. 7) in the axial direction of one of the movable dies 41a. In other words, as illustrated in FIG. 1 to FIG. 3, when the ram 45 is displaced downward and the processing surface (bottom surface) of the teeth-forming punch 32 and the surface on one side in the radial direction of the intermediate material 23 come in contact, then as illustrated in FIG. 7A, the surface on one side in the axial direction of one of the movable dies 41a faces the lower half of the stepped surface 47 by way of a space. In this state, the intermediate material 23 is elastically held between the processing surface of the teeth-forming punch 32 and the pair of movable dies 41a, 41b, which keeps the intermediate material 23 in the proper position. Then, in this state, as illustrated in FIG. 4, when the ram 45 is lowered to the bottom dead center, the pair of movable dies 41a, 41b move downward against the elastic force of the elastic member 42, and the intermediate material 23 is strongly pressed inside the support hole 28 of the stationary die 40. In this way, at the same time or just before the rack teeth 16 begin to be formed on the surface on one side in the radial direction of the intermediate material 23, one movable die 41a is pressed inward in the radial direction (to the left in FIG. 1 to FIG. 7B) due to the engagement between the surface on one side in the axial direction of the one movable die 41a and the upper half of the stepped surface of the pressure punch 46, and the surface on one end in the axial direction of the intermediate material (surface on the right end in FIG. 4 and FIG. 6) is pressed by the constant pressure force toward the inside in the axial direction.

The size of the force by which the pressure punch 46 presses the one movable die 41a (amount of movement in the axial direction of the movable die 41a), and the size of the force by which the processing surface of the teeth-forming punch 32 presses the surface on one side in the radial direction of the intermediate material 23 are regulated by the dimensions in the axial direction of each of the component parts of the completed rack 11c including whether the sizes of these forces are constant or are changed while the rack teeth 16 are being formed.

First, the case will be explained in which, when the length in the axial direction of the portion where the rack teeth 16 are formed on part in the axial direction of the rod section 15 of the completed rack 11c (see FIG. 8) is taken to be $L_{16}$, and the length in the axial direction of the circular rod section 18, which is the remaining portion in the axial direction of the rod section 15 is taken to be $L_{18}$, these lengths satisfy the relationship $L_{18} \leq L_{16}/4$. In this case, when pressing with the teeth-forming punch 32 when forming the rack teeth 16, the amount of metal material of the intermediate material 23 that moves from the end section in the axial direction of the portion where the rack teeth are to be formed 16 is relatively small (when compared with when the length $L_{18}$ in the axial direction of the circular rod section 18 is long). Therefore, by pressing the end surface in the axial direction of the intermediate material 23 with a constant pressure, it is possible to suppress the movement of the metal material of the intermediate material 23. The size of the pressure that the end surface in the axial direction of the intermediate material 23 is pressed is appropriately set based on the kind of the metal material of the intermediate material 23 and the dimensions of the component parts.

On the other hand, when the length $L_{16}$ in the axial direction of the portion where the rack teeth 16 are formed and the length $L_{18}$ in the axial direction of the circular rod section 18 satisfy the relationship $L_{18} \geq L_{16}$, the amount of metal material of the intermediate material 23 that moves from the end section in the axial direction of the portion where the rack teeth 16 are to be formed becomes large. When this kind of relationship is satisfied, as illustrated in FIGS. 9A and 9B, the upper half of the surface on the other side in the axial direction of the pressure punch 46 is taken to be an inclined surface 48 that is inclined toward the inside in the axial direction when going in an upward direction. Moreover, a separate inclined surface 49 that engages with the inclined surface 48 is formed on the surface on one side in the axial direction of the one movable die 41a. As a result, as ram 45 (see FIG. 1 to FIG. 4) moves downward, it is possible to increase the pressure by which the one movable die 41a presses the surface on one end in the axial direction of the intermediate material 23. The angle of inclination of the inclined surface 48 and the other inclined surface 49 are also appropriately determined based on the kind of the metal material of the intermediate material 23 and the dimensions of the component parts.

When the lengths $L_{16}$, $L_{18}$ in the axial direction satisfy the relationship $L_{16}/4 < L_{18} < L_{16}$, the shape of the pressure punch 46, including whether to make the surface on the other side in the axial direction of the pressure punch 46 a stepped surface such as illustrated in FIGS. 7A, 7B, or an inclined surface 48 such as illustrated in FIGS. 9A, 9B, is appropriately regulated based on the metal material of the intermediate material 23 and the dimensions of the component parts.

Moreover, in this example, in order to adjust the up-down position of the pressure punch 46 with respect to the ram 45, the pressure punch 46 is provided on the bottom surface of the ram 45 by way of a spacer 50. However, construction is possible in which instead of the spacer 50, the amount of displacement in the up-down direction of the ram 45 is maintained by providing an elastic member that contracts in the up-down direction when the one movable die 41a is strongly pressing the surface on one end in the axial direction of the intermediate material 23. Furthermore, the position in the axial direction of the pressure punch 46 with respect to the teeth-forming punch 32 can be adjusted by changing the thickness of a shim plate 51 that is sandwiched between the teeth-forming punch 32 and the pressure punch 46.

In either case, as the teeth-forming punch 32 is lowered, the flat surface section 25 (see FIG. 20C) of the intermediate material 23 is plastically deformed to conform to the wave-shaped unevenness for molding that is provided on the processing surface of the teeth-forming punch 32, and the rack teeth 16 are formed. When doing this, the surface on the one end in the axial direction of the intermediate material 23 (surface on the right end in FIG. 4) is pressed by the one movable die 41a toward the inside in the axial direction, and the intermediate material 23 is strongly held in the axial direction between the pair of movable dies 41a, 41b, and pressed in the axial direction. After that, when the ram 45 is caused to move upward, the elastic force of the elastic member 42 causes the pair of movable dies 41a, 41b to move upward with the rack teeth 16 of the raw rack 33a in contact as is with the processing surface of the teeth-forming punch 32. In the process of raising the ram 45 to the top dead center, the raw rack 33a becomes separated from the teeth-forming punch 32, so the raw rack 33a is removed. The completed rack 11c is then obtained by performing a sizing process as in the conventional technology on the raw rack 33a that was processed in this way.

Figure 10:
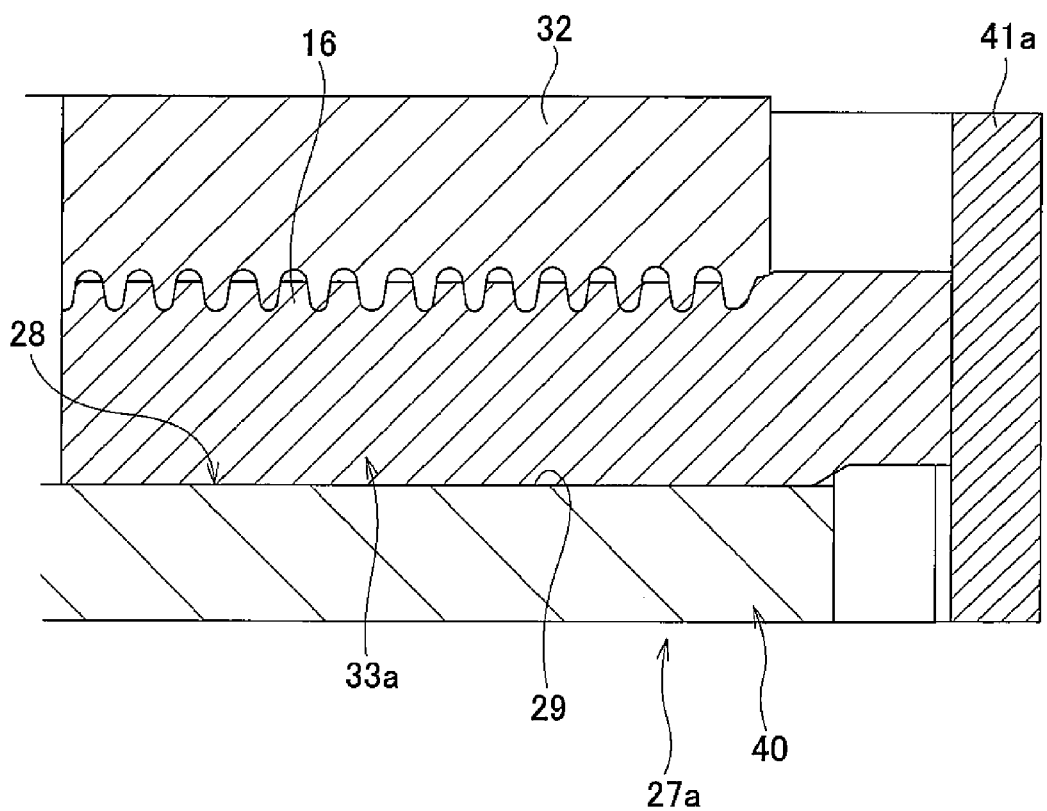
FIG. 10 is a view for explaining the effect of the invention, and corresponds to an enlarged view of the right half of FIG. 6

With the manufacturing method and manufacturing device for a rack of this example, it is possible to maintain the tooth depth of the rack teeth 16 over the entire length in the axial direction. In other words, when plastically deforming the surface on one side in the radial direction of the intermediate material 23 and forming the rack teeth 16, the intermediate material 23 is pressed in the axial direction. Therefore, as the teeth-forming punch 32 presses, the metal material of the intermediate material 23 is kept from moving toward the outside in the radial direction on the end section in the axial direction of the portion where the rack teeth 16 are to be formed. As a result, as illustrated in FIG. 10 and FIG. 11B, it is possible to prevent the tooth depth of the rack teeth 16 on the end section in the axial direction of the rack teeth 16 from becoming small.

More specifically, the rack of the present invention can be distinguished from the rack according to conventional technology by the following points. FIG. 11A and FIG. 11B illustrate the state in which rack teeth 16 have been formed on an intermediate material 23 where only one dummy tooth 39a is provided by using the conventional technology and the present invention. When the rack teeth 16 are formed without pressing the intermediate material 23 in the axial direction, then as illustrated in FIG. 11A, at the end section in the axial direction of the rack teeth 16, the tooth depth of the rack teeth 16 becomes smaller going toward the outside in the axial direction; the end section of the portion that is adjacent in the axial direction with the portion where the rack teeth 16 are formed does not come in contact with the teeth-forming punch 32; and, in this end section, the fiber flow that is a flow of the fibrous structure of the metal material of the intermediate material 23 is formed so as to rise monotonously as separated from the portion where the rack teeth 16 are to be formed. On the other hand, with the present invention, when the rack teeth 16 are formed by pressing the intermediate material 23 in the axial direction, even when only one dummy tooth 29a is provided or the dummy tooth is omitted, the tooth depth of the rack teeth 16 is maintained at the same size as the tooth depth in the middle section in the axial direction even at the end section in the axial direction of the rack teeth 16. Moreover, the end section of the portion that is adjacent in the axial direction to the portion where the rack teeth 16 are formed comes in contact with the teeth-forming punch 32 and has sufficient thickness, and the fiber flow in this portion has a slight upward convex shape. Having this kind of structure, in the case of the present invention, when the completed rack 11c is assembled in the steering gear 5, it is possible to maintain proper tooth engagement on the end section in the axial direction of the rack teeth 16 between the rack teeth 16 and the pinion that is formed around outer-circumferential surface of the input shaft 6, and even when a screw hole 57 for screwing a male screw of a ball joint into is formed nearby, for example, it is easy to maintain the strength of the completed rack 11c in this portion.

Figure 23:
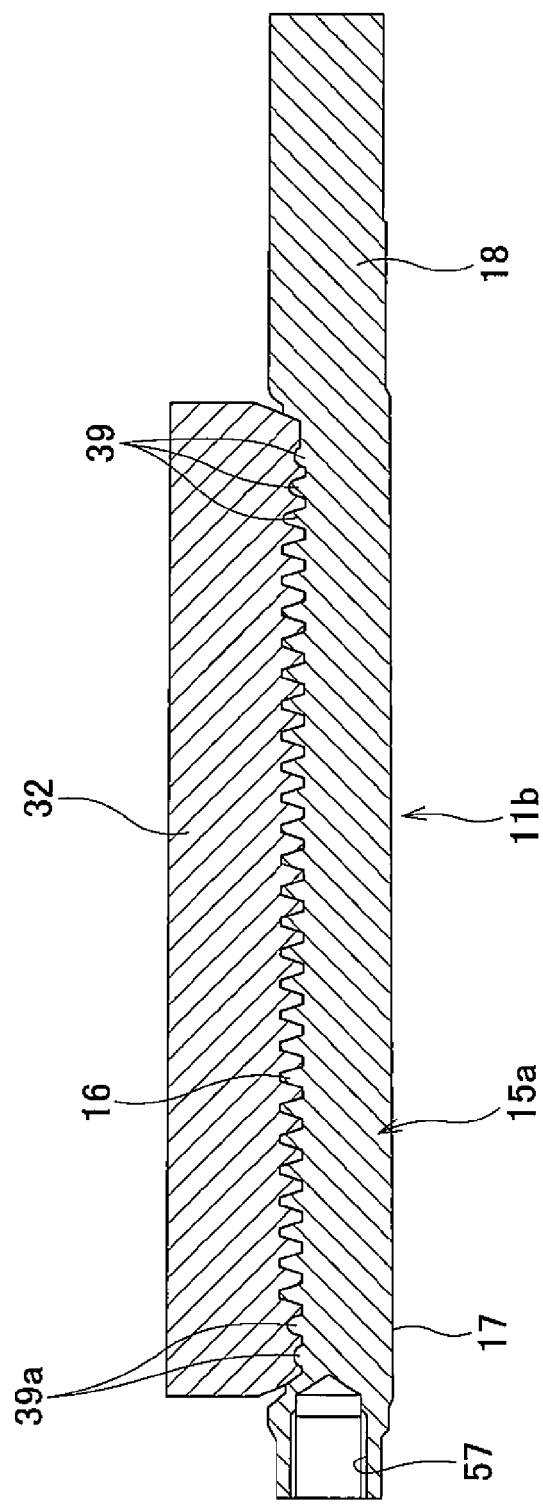
FIG. 23 is a cross-sectional view illustrating a second example of a conventional manufacturing method for a rack.

Furthermore, in the case of this example, even when dummy teeth 39, 39a (see FIG. 23) are not provided or are temporarily provided in the portion adjacent in the axial direction to the rack teeth 16, it is possible to keep the number to a minimum. Therefore, it is possible to prevent the length in the axial direction of the processing tools (punch and dies) from increasing, and in the case in which a screw hole 57 (see FIG. 23) is formed in the end section of the rack 11c, it is possible to prevent the thickness of the end section from becoming small.

[Second Example]

Figure 13:
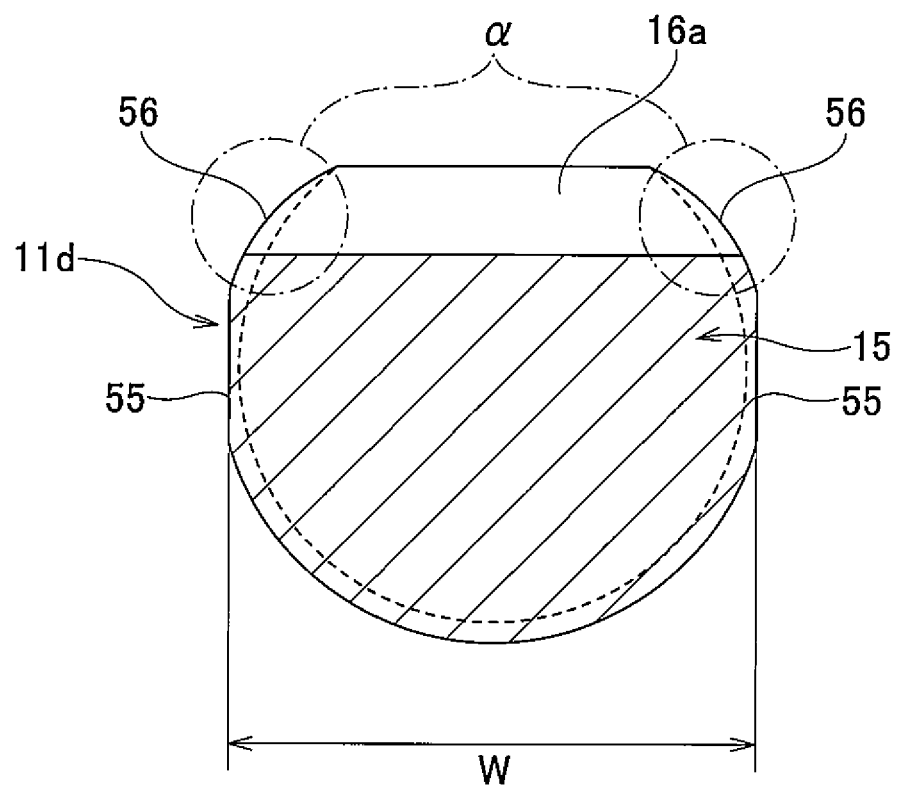
FIG. 13 is an enlarged cross-sectional view of section c-c in FIG. 12F.
Figure 14:
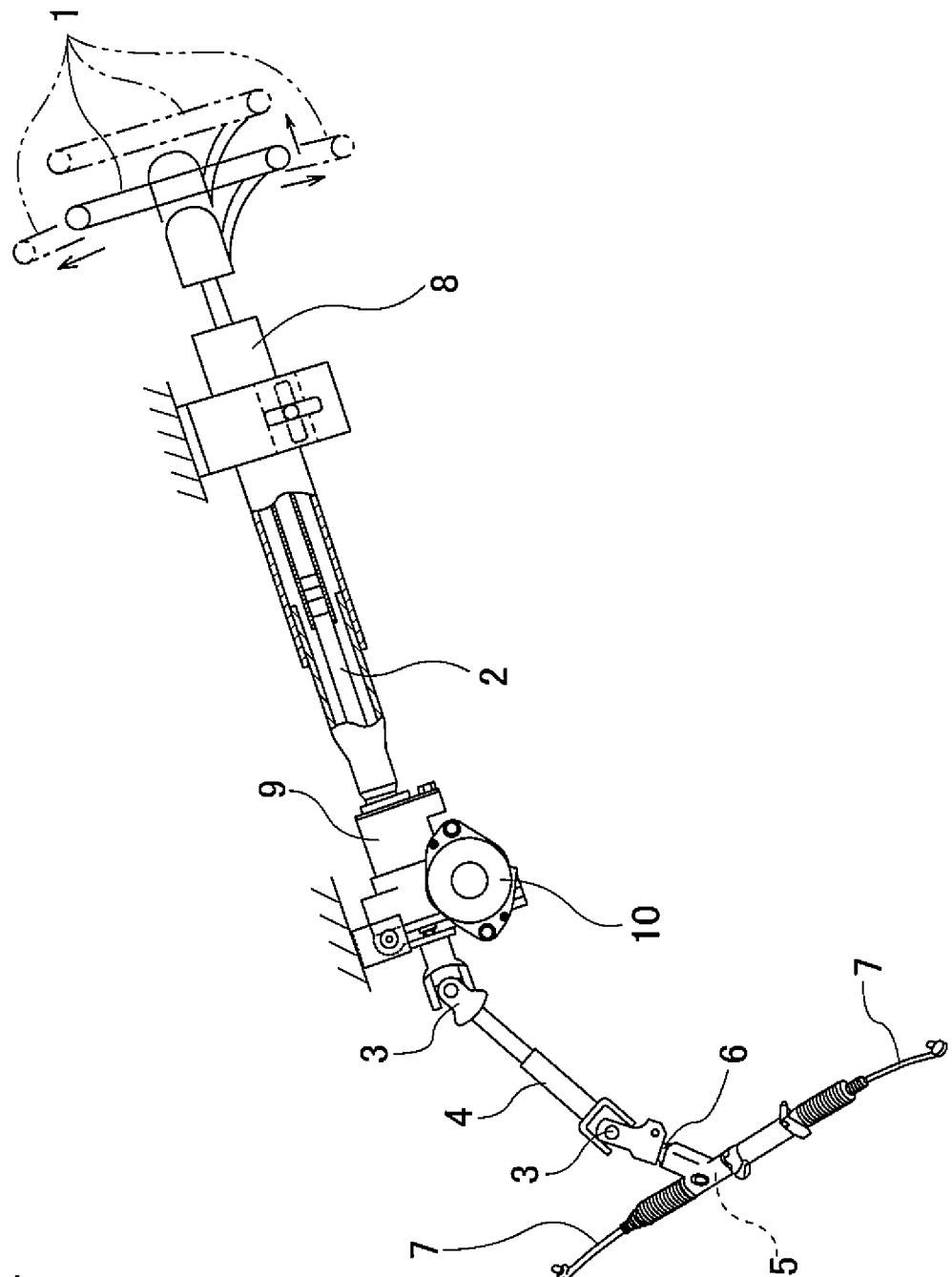
FIG. 14 is a partial cross-sectional view illustrating a first example of a conventional steering apparatus for an automobile.
Figure 15:
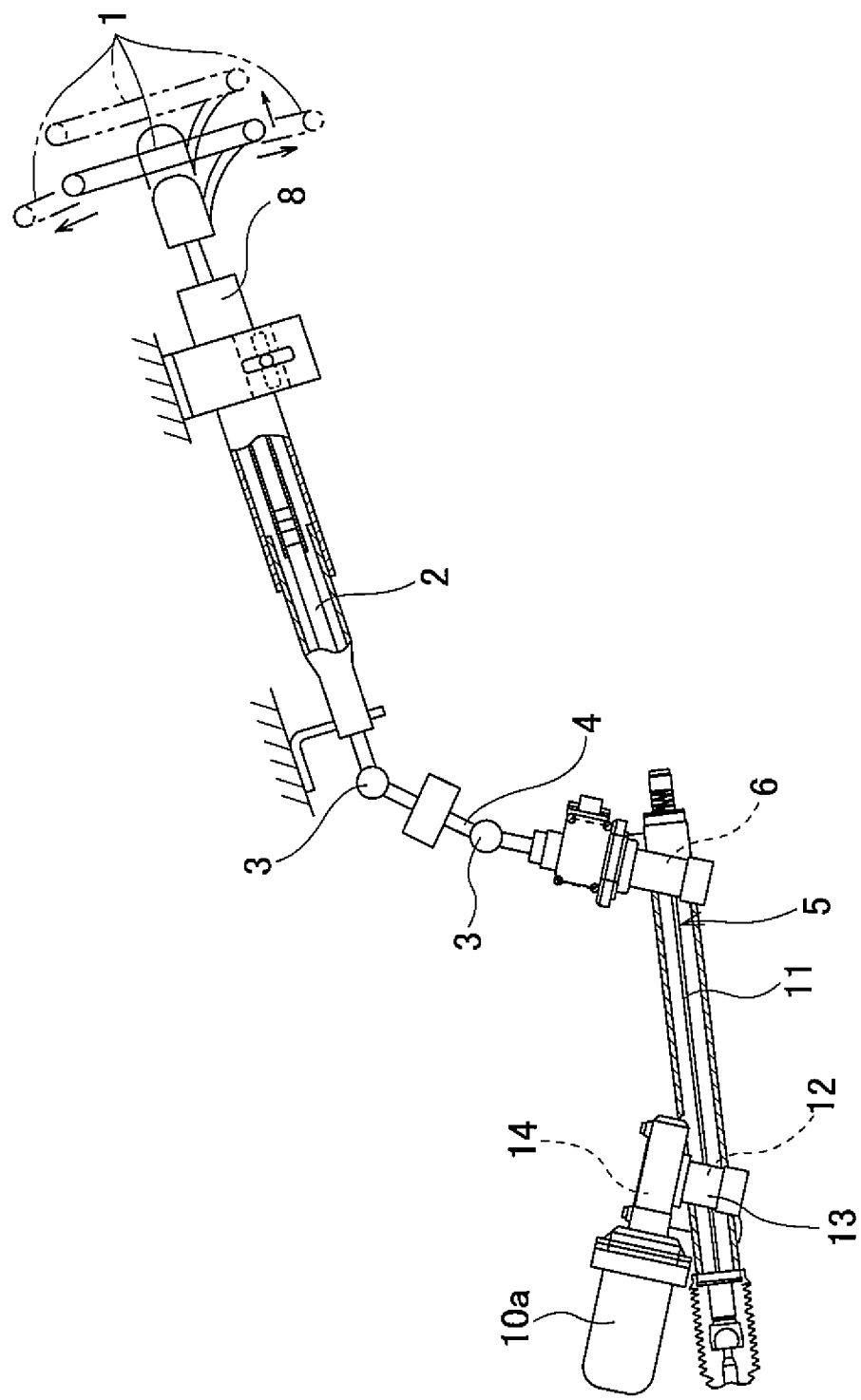
FIG. 15 is a partial cross-sectional view illustrating a second example of a conventional steering apparatus for an automobile.
Figure 16:
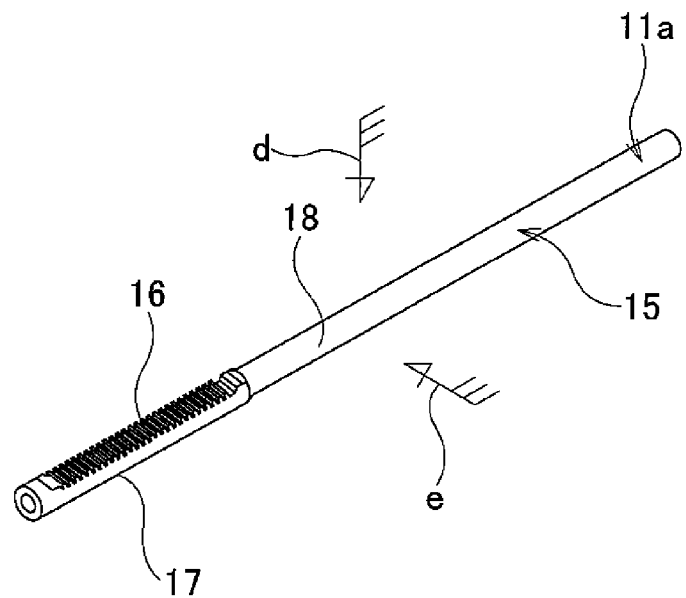
FIG. 16 is a perspective view illustrating an example of a conventional rack.
Figure 17:
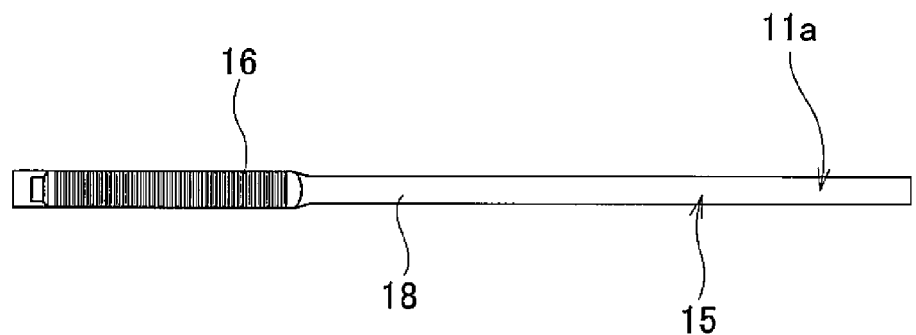
FIG. 17 is a view as seen in the direction d in FIG. 16.
Figure 18:
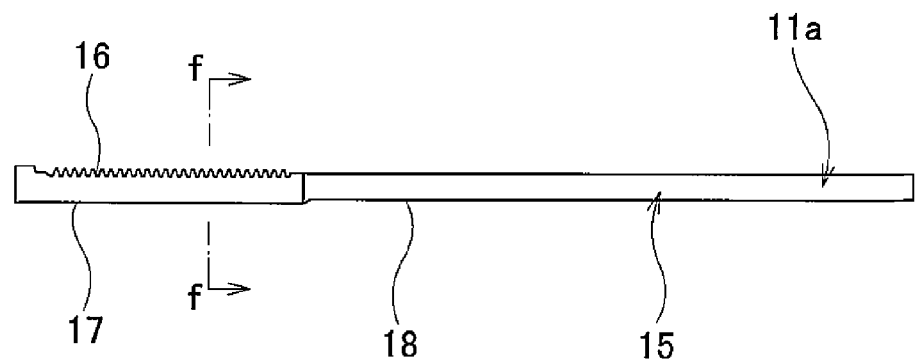
FIG. 18 is a view as seen in the direction e in FIG. 16.
Figure 19:
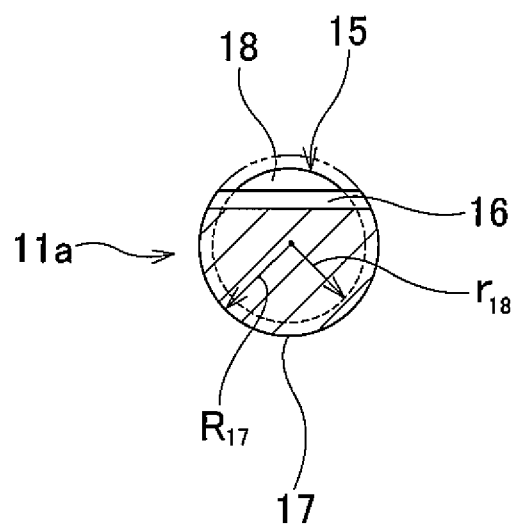
FIG. 19 is an enlarged cross-sectional view of section f-f in FIG. 18.

FIGS. 12A to 13 illustrate a second example of an embodiment of the present invention. This example is an example of manufacturing a rack 11 (see FIG. 15) that is to be assembled in a dual-pinion type electric-powered power-steering apparatus as illustrated in FIG. 15. Therefore, as illustrated in FIG. 12A to FIG. 12D, rack teeth 16 are formed in one half in the axial direction of a raw material 19a in the same way as in the first example. However, in this example, a sizing process is performed on the raw rack 33 by pressing with a sizing punch 52 with the raw rack 33 set as is in the die 27.

In this example, by independently providing rack teeth 16, 16a having different torsion angles at two locations in the axial direction of the rack 11, the angle between the center axis of the first input shaft 6 and the center axis of the rack 11, and the angle between the center axis of the second input shaft 12 and the center axis of the rack 11 are made to be different (see FIG. 13). Therefore, different rack teeth 16a having a different torsion angle than the rack teeth 16 are formed on the other half section in the axial direction of the obtained intermediate material 53. These different rack teeth 16a are also basically formed by the same procedure as the rack teeth 16. However, in this example, the shape of the tip-end surface of the punch 22a that presses the portion where the rack teeth 16a are to be formed is a curved surface having a radius of curvature $R_{22}$ that is larger than the radius of curvature $r_{21}$ of the concave groove section 21 that is provided in the receiving mold 20. Moreover, the finishing die that is used in the process (FIG. 12F) of forming rack teeth 16a by pressing the intermediate material 52 with the punch 32a for forming teeth, and the process (FIG. 12G) of using a sizing punch 52a to perform a sizing process on the second intermediate material that was obtained is the same as that used between the process of forming the rack teeth 16a and the sizing process. Therefore, it is possible to keep down an increase in management cost for managing the finishing die, and thus it is possible to reduce the manufacturing cost of the rack 11. Furthermore, both inside surfaces in the width direction of the finishing die are flat surfaces that are parallel with each other. As a result, both outside surfaces in the width direction of the portion of the raw rack 58 where the rack teeth 16a are formed are flat surface sections 55 that are parallel with each other, and the connecting sections between the flat surface sections 55 and the portion where the rack teeth 16a are formed (portion surrounded by the chain line α in FIG. 13) are a pair of curved surface sections 56 having a comparatively small radius of curvature. The rack 11 is obtained by performing finishing such as heat treatment and polishing on this kind of raw rack 58.

Table 1 is for the case of manufacturing a rack 11 that is to be assembled in a dual-pinion type electric-powered power-steering apparatus, and illustrates examples of dimensions of each of the parts used when forming rack teeth 16a that engage with a pinion that is formed around the outer-circumferential surface of the input shaft 6.

TABLE 1

| Rack 11 | Pressure punch 22a and Receiving mold 20 | Punch 32a for forming teeth and finishing die | Sizing punch 52a and finishing die |
|---|---|---|---|
| Width W of flat surface sections 55: 29[mm] | Radius of curvature $R_{22}$: 31.5[mm] | Pressure angle of rack teeth 16a: 10 degrees Radius of curvature of the bottom section of the finishing die: 13.5[mm] | Pressure angle of rack teeth 16a: 20 degrees Radius of curvature of the bottom section of the finishing die: 13.5[mm] |
| Radius of curvature $R_{17}$ of the rear surface portion: 13.5[mm] | Radius of curvature $r_{21}$: 13.5[mm] | Width between inside surfaces: 29[mm] | Width between inside surfaces: 29[mm] |
| Width W of flat surface sections 55: 28[mm] | Radius of curvature $R_{22}$: 31.5[mm] | Pressure angle of rack teeth 16a: 10 degrees Radius of curvature of the bottom section of the finishing die: 15[mm] | Pressure angle of rack teeth 16a: 20 degrees Radius of curvature of the bottom section of the finishing die: 15[mm] |
| Radius of curvature $R_{17}$ of the rear surface portion: 15[mm] | Radius of curvature $r_{21}$: 15[mm] | Width between inside surfaces: 28[mm] | Width between inside surfaces: 28[mm] |
| Width W of flat surface sections 55: 26.5[mm] | Radius of curvature $R_{22}$: 31.5[mm] | Pressure angle of rack teeth 16a: 10 degrees Radius of curvature of the bottom section of the finishing die: 19[mm] | Pressure angle of rack teeth 16a: 20 degrees Radius of curvature of the bottom section of the finishing die: 19[mm] |
| Radius of curvature $R_{17}$ of the rear surface portion: 19[mm] | Radius of curvature $r_{21}$: 19[mm] | Width between inside surfaces: 26.5[mm] | Width between inside surfaces: 26.5[mm] |

In the examples in Table 1, the radius of curvature $R_{22}$ of the pressure punch 22a is 31.5 mm in all examples. By using the same pressure punch 22a in this way regardless of the shape of the completed rack teeth 16a, it is possible to reduce the manufacturing cost of the rack 11. However, the radius of curvature $R_{22}$ can be selected from the range 10 mm to 250 mm to correspond to the shape of the rack teeth 16a to be formed. Moreover, by making the radius of curvature $r_{21}$ of the receiving mold 20 the same as the radius of curvature of the bottom section of the finishing die, sliding of the metal material of the raw material 19 is kept small, and wear of the finishing die is suppressed. Furthermore, in this example, when forming the rack teeth 16, 16a, the rod section 15 is pressed by the pressure punch 46 and the movable die 41a illustrated in FIG. 9 in the axial direction within the range of 3.5 mm or less (0 mm to 3.5 mm). The construction and functions of the other parts are the same as in the first example of an embodiment.

EXPLANATION OF REFERENCE NUMBERS

1 Steering wheel
2 Steering shaft
3 Universal joint
4 Intermediate shaft
5 Steering gear
6 Input shaft
7 Tie rod
8 Steering column
9 Gear housing
10, 10a Electric motor
11, 11a to 11c Rack
12 Second input shaft
13 Housing
14 Reduction gear
15, 15a Rod section
16, 16a Rack teeth
17 Rear surface portion
18 Circular rod section
19 Raw material
20 Receiving mold
21 Concave groove section
22 Pressure punch
23 Intermediate material
24 Partial cylindrical surface section
25 Flat surface section
26 Curved surface section
27, 27a Die
28 Support hole
29 Bottom section
30 Inside surface
31 Inclined guide surface
32 Teeth-forming punch
33, 33a Raw rack
34 Flat flank surface
35 Sizing die
36 Uneven sizing surface
37 Stamp
38 Concave pressing groove
39, 39a Dummy teeth (excess material section)
40 Stationary die
41a, 41b Movable die
42 Elastic member
43 Support base
44 Concave section
45 Ram
46, 46 Pressure punch
47 Stepped surface
48 Inclined surface
49 Inclined surface
50 Spacer
51 Shim plate
52, 52a Sizing punch
53 Intermediate material
54 Second intermediate material
55 Flat surface section
56 Curved surface section
57 Screw hole
58 Raw rack

What is claimed is:

1. A manufacturing method for a rack comprising a step of:
    forming rack teeth on a surface on one side in a radial direction of a raw material made of metal by pressing a teeth-forming punch that is provided with rack-shaped uneven processing teeth against a part in an axial direction of the surface of the raw material made of metal, and causing the surface to plastically deform, while pressing the raw material toward an inside in the axial direction,
    wherein a pressure punch that raises and lowers together with the teeth-forming punch, and comprises a surface on one side in the axial direction that is a stepped surface; and a movable die that comprises a surface on one side in the axial direction that faces an end surface in the axial direction of the raw material, and a surface on another side in the axial direction that faces the stepped surface of the pressure punch when the teeth-forming punch is displaced toward the raw material, and to which an elastic force is applied toward the pressure punch; are used, and the stepped surface of the pressure punch is engaged with the surface on the other side in the axial direction of the movable die as the teeth-forming punch moves toward the raw material, causing the movable die to move in the axial direction, and pressing the surface on the end surface in the axial direction of the raw material in the axial direction by way of the movable die, and
    wherein the raw material is pressed in the axial direction by a constant force while the surface on the one side in the radial direction is being plastically deformed.

2. The manufacturing method according to claim 1, wherein the rack teeth are formed so that when the length in the axial direction of the portion of the raw material where the rack teeth are formed is taken to be LR, and the length in the axial direction of the remaining portion of the raw material that is separated in the axial direction from the portion where the rack teeth are formed is taken to be L, the relationship $L \leq L_R/4$ is satisfied.

3. A rack that is manufactured using the manufacturing method according to claim 1, wherein the raw material is provided by a metal rod, and the rack teeth are formed on a part in the axial direction of the surface on one side in the radial direction of the rod,
    wherein the tooth depth of the rack teeth at an end section in the axial direction of the part of the surface of the rod is the same size as the tooth depth of the rack teeth in a middle section in the axial direction of the part of the surface of the rod,
    wherein the rod has a portion that is adjacent in the axial direction to the part of the surface where the rack teeth are formed, and the portion that is adjacent in the axial direction to the part of the surface where the rack teeth are formed has a fiber flow having a slight upward convex shape.

4. A manufacturing method for a rack comprising a step of:
forming rack teeth on a surface on one side in a radial direction of a raw material made of metal by pressing a teeth-forming punch that is provided with rack-shaped uneven processing teeth against a part in axial direction of the surface of the raw material made of metal, and causing the surface to plastically deform, while pressing the raw material toward an inside in the axial direction,
wherein a pressure punch that raises and lowers together with the teeth-forming punch, and comprises a surface on one side in the axial direction that is an inclined surface; and a movable die that comprises a surface on one side in the axial direction that faces an end surface in the axial direction of the raw material, and a surface on another side in the axial direction that faces the inclined surface of the pressure punch when the teeth-forming punch is displaced toward the raw material, and to which an elastic force is applied toward the pressure punch; are used, and the inclined surface of the pressure punch is engaged with the surface on the other side in the axial direction of the movable die as the teeth-forming punch moves toward the raw material, causing the movable die to move in the axial direction, and pressing the surface on the end surface in the axial direction of the raw material in the axial direction by way of the movable die,
wherein the raw material is pressed in the axial direction while the force of pressing the raw material in the axial direction is increased as the surface on one side in the radial direction is plastically deformed.

5. The manufacturing method according to claim 4, wherein the rack teeth are formed so that when the length in the axial direction of the portion of the raw material where the rack teeth are formed is taken to be LR, and the length in the axial direction of the portion of the raw material that is separated in the axial direction from the portion where the rack teeth are formed is taken to be L, the relationship $L \geq L_R$ is satisfied.

6. A rack that is manufactured using the manufacturing method according to claim 4, wherein the raw material is provided by a metal rod, and the rack teeth are formed on a part in the axial direction of the surface on one side in the radial direction of the rod,
wherein the tooth depth of the rack teeth at an end section in the axial direction of the part of the surface of the rod is the same size as the tooth depth of the rack teeth in a middle section in the axial direction of the part of the surface of the rod,
wherein the rod has a portion that is adjacent in the axial direction to the part of the surface where the rack teeth are formed, and
the portion that is adjacent in the axial direction to the part of the surface where the rack teeth are formed has a fiber flow having a slight upward convex shape.

7. A manufacturing device for a rack, comprising:
a teeth-forming punch provided with rack-shaped uneven processing teeth;
a pressure punch raising and lowering together with the teeth-forming punch and comprising a surface on one side in an axial direction having a stepped surface or inclined surface; and
a movable die comprising a surface on one side in the axial direction that faces the surface on an end in the axial direction of a raw material made of metal, and a surface on another side in the axial direction that faces the stepped surface or inclined surface of the pressure punch when the teeth-forming punch moves toward the raw material, and to which an elastic force is applied toward the pressure punch; wherein
the manufacturing device for a rack is constructed so that when forming rack teeth on the surface of the one side in a radial direction of part in the axial direction of the raw material made of metal by pressing the teeth-forming punch against the surface on the one side in the radial direction, as the teeth-forming punch moves toward the raw material, the surface on the other side in the axial direction of the movable die engages with the stepped surface or inclined surface of the pressure punch, the movable die moves in the axial direction, and the movable die presses the surface on the end in the axial direction of the raw material.

* * * * *